Sept. 22, 1959 K. A. FREUTEL 2,905,798
INDUCTION HEATING APPARATUS
Filed Sept. 15, 1958
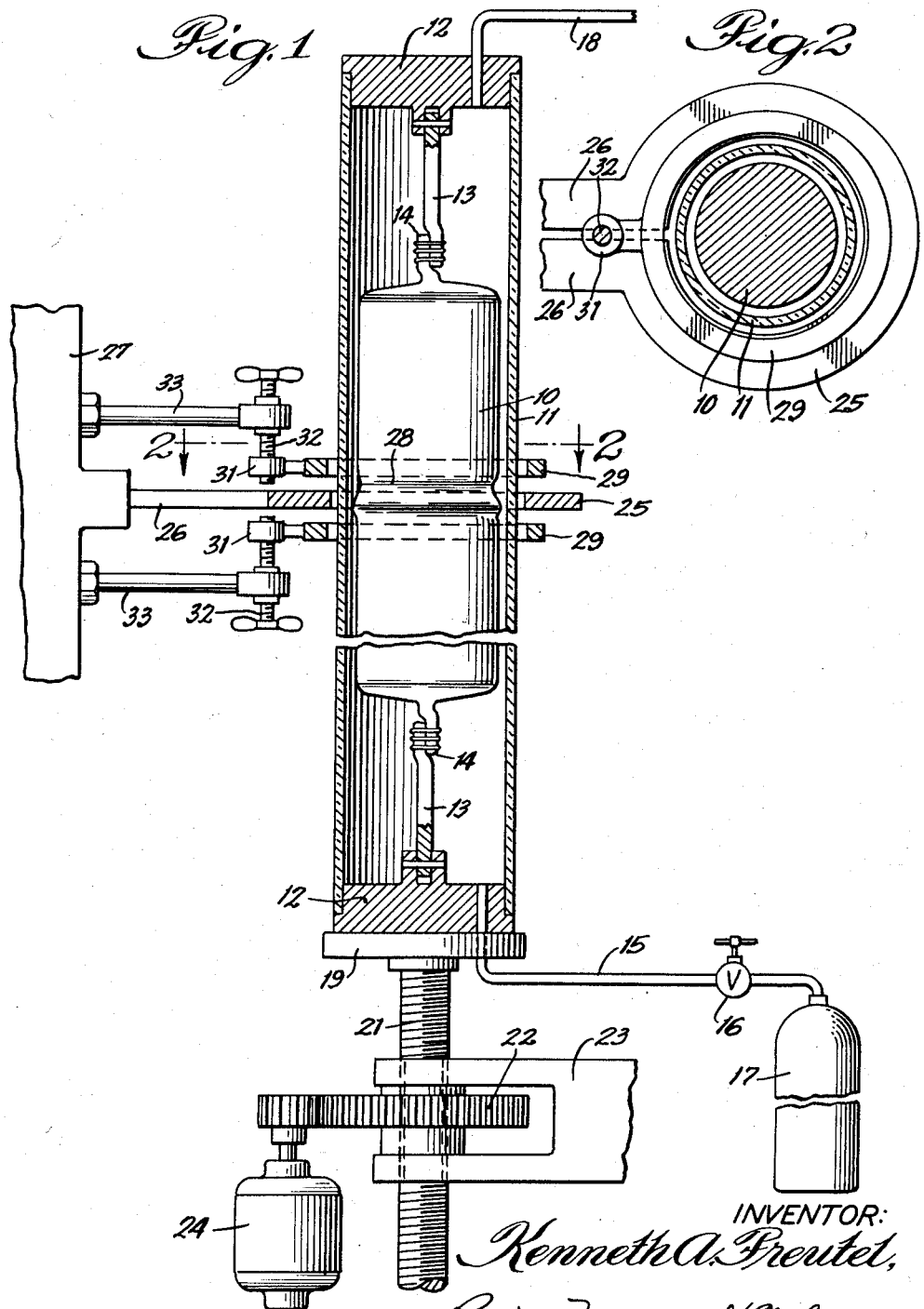
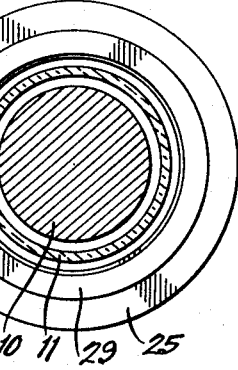
INVENTOR:
Kenneth A. Freutel,
Bair, Freeman & Molinare
BY ATTORNEYS.

United States Patent Office 2,905,798
Patented Sept. 22, 1959

2,905,798

INDUCTION HEATING APPARATUS

Kenneth Albert Freutel, Franklin Park, Ill., assignor to Lindberg Engineering Company, a corporation of Illinois Application September 15, 1958, Serial No. 761,092

1 Claim. (Cl. 219—10.43)

This invention relates to induction heating apparatus and more particularly to apparatus for floating zone purification of semiconductors such as silicon.

For an extremely high degree of purification of semiconductors such as silicon, germanium, tungsten, molybdenum, tellurium, and compounds thereof, the so-called floating zone technique of induction heating has heretofore been used. According to this technique a rod or bar of the semiconductor material is supported inside of a tube of quartz or other nonconducting material in spaced relation thereto with the ends of the tube being sealed off and evacuated or having an inert gas being passed therethrough as the work is processed. The tube is surrounded by an induction coil connected to a source of high frequency energy and a scanning fixture supports the tube to move it vertically downward through the coil at a precise rate of longitudinal movement and in some cases with rotation of the rod or bar. As the rod passes through the coil the high frequency current in the coil induces a current in the rod and develops an intense heat in the area surrounded by the coil. This heat causes a molten zone to be formed in the rod which is supported by the relatively high surface tension of the molten material. The molten or floating zone travels upward along the length of the rod as the rod moves downward through the coil and carries with it impurities in the rod which tend to lower its melting point and which are more readily soluble in the molten than the solid material of the rod. The rod may be passed through the coil a number of times in the same direction and with each pass the purity of the material is increased.

It has been found that in practice there are severe limitations on the maximum length of the permissible molten zone in the rod or bar in practicing the floating zone technique. If the molten zone becomes too long the surface tension is not sufficient to support it and the rod or bar tends to separate with the molten material in the zone flowing out. Since the length of the zone tends to increase with an increase in the diameter of the rod, the size of rods which can be processed by the floating zone technique is restricted. This separation effect is increased by the levitation effect of the coil so that the current which can be used is limited, thereby limiting the heat input and the size of the rods or bars which can be processed.

It is accordingly an object of the present invention to provide induction heating apparatus for floating some purification of semiconductors in which the inductive field is limited to an accurately controlled small zone.

Another object is to provide induction heating apparatus for floating zone purification of semiconductors in which the levitation effect of the heating coil is minimized or counteracted so that the heating current is substantially unlimited and relatively large diameter rods of material can be purified.

According to a feature of the invention, the rod is enclosed in an envelope encircled by an inductive coil and additional closed circuit coils are mounted on opposite sides of the inductive coil in spaced relation thereto to limit and confine the inductive field. Preferably the closed circuit coils are adjustably mounted for movement to and from the inductive coil to adjust the size or length of the molten zone as required.

The above and other objects and features of the invention will be more readily apparent from the following description when read in connection with the accompanying drawing, in which:

Figure 1 is a partially diagrammatic view with parts shown in section of an induction heating apparatus embodying the invention; and Figure 2 is a partial section on the line 2—2 of Figure 1.

The apparatus as shown is adapted to purify by the floating zone technique a rod or bar 10 of semiconductor material such as silicon. For this purpose the rod or bar 10 is enclosed in an envelope 11 of a non-conductive material such as fused quartz. The envelope 11 is closed at its ends by plugs 12, each of which carries a supporting link 13 which may be attached to the adjacent end of the rod 10. For this purpose, as is conventional, the rod 10 is provided with reduced diameter projections 14 which are secured to the links 13 as by wiring them together, as shown. The envelope 11 is of somewhat larger diameter than the rod 10 so that there will be no contact between them.

Preferably an inert gas is circulated through the envelope during processing for which purpose openings may be formed in the end plugs 12. As shown, the lower plug is connected through a conduit 15 and a control valve 16 to a supply of inert gas indicated at 17. A conduit 18 is connected to the upper plug and may lead to any desired point of disposition of the gas.

The envelope and rod are adapted to be moved vertically for scanning. Any suitable type of scanning apparatus may be employed for this purpose but, as shown, the envelope is supported at its lower end on a platform 19 carried by a screw 21. The screw is threaded through an internally threaded gear 22 which is rotatably supported in a stationary fixture 23 and is driven by a motor 24. When the motor is running to turn the gear 22, the envelope and rod will be moved vertically at a predetermined rate to effect the desired scanning function.

The rod is adapted to be heated by an induction coil which is preferably in the form of a flat pancake coil having one or more turns. As shown, the coil is in the form of a flat strip 25 encircling and spaced slightly from the envelope 11 with its ends defining terminals 26. While a single turn coil has been shown, it will be understood that a multiple turn flat coil could be used equally well if desired. The terminals 26 of the coil are connected to a high frequency generator partially indicated at 27 which may be of any desired type to supply high frequency current to the coil.

With the apparatus as so far described, when the envelope and rod are moved through the coil the material of the rod will be melted in a zone indicated at 28 due to the high frequency current induced in the rod by the coil. The surface tension of the material will normally hold the molten portion thereof in place, although the rod may bulge slightly as illustrated. As the rod is passed through the coil by the scanning fixture, the molten zone 28 will travel along the rod and will purify the material thereof in the manner of the well-known floating zone technique.

According to the present invention, the length of the floating zone produced by the inductive effect of the coil 25 is limited and restricted so that a relatively short floating zone can be produced. By this means rods of relatively large diameter can be processed without causing separation due to flow-out of the molten material.

For this purpose a pair of closed circuit single turn coils 29 are mounted on opposite sides of the induction coil 25 in spaced relation thereto. Each of the coils 29 is mounted for adjustment toward and away from the coil 25 so that the effective inductive field and therefore the length of the molten zone can be adjusted. As shown, each coil 29 carries a threaded boss 31 at one side through which an adjusting screw 32 is threaded. The adjusting screws 32 are rotatably carried by fixed brackets 33 which may conveniently be supported on the generator 27 so that by adjusting the screws 32 the coils 29 can be moved toward or away from the coil 25.

In operation, when the coil 25 is energized, preferably with a high frequency current on the order of 4 mc, it will not only induce current in the rod or bar 10 but also in the coils 29. The current in coils 29 is counter to the current in coil 25 and produces a counter flux which confines the effective heating flux produced by the coil 25 to a narrow vertical zone without excessively reducing the inductive transfer of power from the coil 25 to the rod or bar. In this way the molten zone in the rod or bar is kept very narrow lengthwise thereof so that the power input and speed of operation for a rod of a given size can be increased or rods or bars of larger cross section can be processed.

It has also been observed that when the coils 29 are used the metal tends to be held in the column in the molten zone to a much greater degree for a zone of the same size than when these coils are not present. The exact reason for this is not fully understood but may be due to the fact that the coils 29 produce a levitation effect counter to the levitation effect produced by coil 25. In any event the tendency for the bar or rod to separate has been found to be substantially less when coils 29 are used.

While one embodiment of the invention has been shown and described, it will be understood that this is illustrative only and is not to be taken as a definition of the scope of the invention, reference being had for this purpose to the appended claim.

What is claimed is:

Induction heating apparatus for floating zone purification of semiconductors comprising a tube of nonconducting material, a rod of material capable of being heated in an inductive field mounted in the tube, a coil around the tube inductively coupled to the rod and connected to a source of high frequency heating current, the coil inducing sufficient heat in the rod to melt the material thereof in a zone adjacent to the coil, means to move the coil and rod relatively lengthwise of the rod, a closed circuit coil around the tube on each side of and spaced from the first named coil to confine the zone of the rod melted by induction by the first coil to a relatively short length of the rod, and means adjustably mounting the last named coils for movement lengthwise of the tube toward and away from the first named coil.

References Cited in the file of this patent

UNITED STATES PATENTS

| | | |
|---|---|---|
| 2,202,758 | Denneen et al. | May 28, 1940 |
| 2,461,283 | Jordan | Feb. 8, 1949 |
| 2,743,199 | Hull et al. | Apr. 24, 1956 |
| 2,749,423 | Bisterfeld | June 5, 1956 |
| 2,845,377 | Seulen et al. | July 29, 1958 |

FOREIGN PATENTS

| | | |
|---|---|---|
| 710,426 | Great Britain | June 9, 1954 |